United States Patent
Jörg et al.

(10) Patent No.: US 11,433,850 B2
(45) Date of Patent: Sep. 6, 2022

(54) GAS GENERATOR HAVING A PYROTECHNIC PROPELLING CHARGE AND METHOD FOR PRODUCING THE PROPELLING CHARGE

(71) Applicant: TRW Airbag Systems GmbH, Aschau a. Inn (DE)

(72) Inventors: Friedrich Jörg, Oberbergkirchen (DE); Siegfried Jahnel, Töging (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 713 days.

(21) Appl. No.: 16/319,573

(22) PCT Filed: Jul. 21, 2017

(86) PCT No.: PCT/EP2017/068461
§ 371 (c)(1),
(2) Date: Jan. 22, 2019

(87) PCT Pub. No.: WO2018/019713
PCT Pub. Date: Feb. 1, 2018

(65) Prior Publication Data
US 2021/0276508 A1    Sep. 9, 2021

(30) Foreign Application Priority Data
Jul. 26, 2016 (DE) .......................... 102016113732.4

(51) Int. Cl.
*B60R 21/264* (2006.01)
(52) U.S. Cl.
CPC ............................. *B60R 21/2644* (2013.01)

(58) Field of Classification Search
CPC . B60R 21/2644; B60R 21/264; B60R 21/263; B60R 21/272
See application file for complete search history.

(56) References Cited

U.S. PATENT DOCUMENTS

| 5,089,069 A | 2/1992 | Ramaswamy et al. |
| 5,397,543 A | 3/1995 | Anderson |

(Continued)

FOREIGN PATENT DOCUMENTS

| DE | 202006008857 | 9/2006 |
| DE | 102007023046 | 11/2008 |

(Continued)

OTHER PUBLICATIONS

Machine Translation of WO2004080767 (Year: 2004).*

(Continued)

*Primary Examiner* — Paul N Dickson
*Assistant Examiner* — Kurtis Nielson
(74) *Attorney, Agent, or Firm* — Tarolli, Sundheim, Covell & Tummino LLP

(57) ABSTRACT

A gas generator for use for a safety device in vehicles comprises a pyrotechnical propelling charge, wherein the propelling charge is formed from a first and at least a second master batch which are in a mixed state in a filling. Each master batch has a plurality of molded propellant bodies having defined geometry and having a relative quickness. The relative quickness RQ2 of the second master batch is less than the relative quickness RQ1 of the first master batch, wherein $RQ2=RQ1 \cdot fq$ and $fq \leq 0.9$. The invention further relates to a method for producing the propelling charge.

22 Claims, 2 Drawing Sheets

(56) References Cited

U.S. PATENT DOCUMENTS

| | | | |
|---|---|---|---|
| 5,564,743 A * | 10/1996 | Marchant | B60R 21/2644 222/3 |
| 5,868,424 A * | 2/1999 | Hamilton | C06B 21/0066 280/741 |
| 5,967,550 A | 10/1999 | Shirk et al. | |
| 6,032,979 A * | 3/2000 | Mossi | B60R 21/2644 280/741 |
| 6,062,143 A | 5/2000 | Grace et al. | |
| 6,364,354 B1 * | 4/2002 | Nakashima | B01D 46/2411 280/736 |
| 6,562,161 B1 * | 5/2003 | Yamato | B60R 21/2644 149/19.4 |
| 6,682,708 B1 * | 1/2004 | Zeuner | B60R 21/272 102/530 |
| 8,656,838 B1 * | 2/2014 | Mayville | C06D 5/00 102/530 |
| 8,783,188 B1 * | 7/2014 | Mayville | B60R 21/2644 102/530 |
| 2004/0050283 A1 | 3/2004 | Daoud | |
| 2005/0019139 A1 * | 1/2005 | Aoyama | C06B 21/0091 414/147 |
| 2005/0104348 A1 * | 5/2005 | McCormick | B60R 21/2644 280/741 |
| 2005/0161923 A1 * | 7/2005 | Hirooka | B60R 21/2644 280/741 |
| 2006/0022443 A1 | 2/2006 | Stevens et al. | |
| 2008/0217893 A1 | 9/2008 | Serizawa et al. | |
| 2010/0109304 A1 * | 5/2010 | Serizawa | C06D 5/06 280/741 |
| 2010/0186615 A1 * | 7/2010 | Kodama | F42B 3/103 102/530 |
| 2010/0253053 A1 * | 10/2010 | Hayakawa | B60R 21/2646 280/736 |
| 2013/0200601 A1 * | 8/2013 | Niehaus | C06B 45/00 280/741 |
| 2017/0028963 A1 * | 2/2017 | Katsuta | B60R 21/264 |

FOREIGN PATENT DOCUMENTS

| | | | | |
|---|---|---|---|---|
| FR | 2910941 A1 * | 7/2008 | | F15B 15/19 |
| JP | 2002283942 | 10/2002 | | |
| JP | 2003191816 A * | 7/2003 | | B60R 21/2644 |
| WO | WO-0018619 A1 * | 4/2000 | | C06D 5/06 |
| WO | WO-2004024653 A2 * | 3/2004 | | B60R 21/2644 |
| WO | WO-2004058606 A1 * | 7/2004 | | B09B 3/0083 |
| WO | WO-2004058610 A1 * | 7/2004 | | B65G 29/00 |
| WO | WO-2004080767 A1 * | 9/2004 | | B60R 21/2644 |
| WO | 2006022753 | 3/2006 | | |
| WO | WO-2007018491 A1 * | 2/2007 | | B60R 21/2644 |
| WO | 2012055460 | 5/2012 | | |

OTHER PUBLICATIONS

Machine Translation of WO0018619 (Year: 2000).*
Ballistic Research Laboratories, article entitled "Ignition Transients and Pressurization in Closed Chambers" Nov. 1975.
Article entiled "The Closed Bomb Test for the Assessment of Solid Propellant Grains Utilized in Guns", pp. 229-240 (1975).

* cited by examiner

GAS GENERATOR HAVING A PYROTECHNIC PROPELLING CHARGE AND METHOD FOR PRODUCING THE PROPELLING CHARGE

RELATED APPLICATIONS

This application corresponds to PCT/EP2017/068461, filed Jul. 21, 2017, which claims the benefit of German Application No. 10 2016 113 732.4, filed Jul. 26, 2016, the subject matter of which are incorporated herein by reference in their entirety.

BACKGROUND OF THE INVENTION

The invention relates to a gas generator having a pyrotechnical propelling charge, especially for use in a safety device for vehicles.

In the case of emergency, safety devices in vehicles must be activated within a split second. This applies to inflatable restraint devices such as airbags as well as to belt tensioners, knee bolsters and the like. Pyrotechnical gas generators are suited to activate said safety devices as they produce the amount of gas required sufficiently quickly.

DE 20 2006 008 857 U1 describes a pyrotechnical gas generator in which a propelling charge is present in a loose filling of propellant pellets, the filling consisting of a first partial filling disposed on the igniter side and a second partial filling directly adjacent to the first partial filling. The propellant pellets of the first and second partial fillings have different geometries so that a burn-off rate of the first partial filling is higher than the burn-off rate of the second partial filling. This enables the partial fillings to be ignited in a controlled manner in two stages without coating the partial fillings and without separating the two partial fillings by a partition. The two partial fillings are intended to be filled in such compact manner and to be stored so densely that, in spite of vibrations, the partial fillings are not segregated and thus the full functionality of the gas generator is ensured over the service life of the automotive vehicle.

From WO 2012/055460 A1 a gas generator having a propelling charge formed from substantially cylindrical propellant pellets is known which are obtained by dry pressing of a powdered propellant composition and have a maximum diameter of 2 mm as well as a relative bulk density of at least 0.5. The relative bulk density is substantially defined by the geometry of the propellant body. In ballistic tests, i.e. tests to examine the function of the gas generator, said small-dimensioned propellant pellets show a very tight dispersion as the grain size distribution and, resp., propellant pellet geometry in the propelling charge can be adjusted and reproduced within narrow limits. The ballistic properties of the propelling charges are also intended to be variably and reproducibly adjusted by variation of the grain size distribution and, resp., propellant pellet geometry by the use of pellets of different sizes.

In commercial fabrication of a gas generator the pyrotechnic propelling charge is manufactured by means of a fabrication order of exact specifications as regards grinding time of a propellant power and the geometry of the propellant pellets. With an increasing number of gas generator variants and additional power gradings within such variant also the number of the propelling charges to be individually fabricated will increase. After manufacture of the propelling charges, samples are taken from each batch and the ballistic properties of the batches are examined in a so-called standard combustion chamber and/or directly within the gas generator. Only after that will a classification be made as to the gas generator variant for which the propelling charge batch produced is in fact suited or as to whether the batch has to be further blended or cross-mixed. Said procedure requires a large number of propelling charge variants that have to be separately pressed and stored. Moreover, high testing effort for said number of propelling charge variants and great effort in a further finishing of propelling charge batches which do not correspond to the ballistic specification is resulting from the increasing number of the propelling charge variants.

SUMMARY OF THE INVENTION

Therefore, the object underlying the invention is to provide a pyrotechnical propelling charge having a predetermined ballistic profile and can be produced at low cost and to provide a gas generator comprising said pyrotechnical propelling charge.

To achieve this object with respect to the gas generator, according to the invention a gas generator according to claim 1 is provided and with respect to the pyrotechnical propelling charge a method for producing a pyrotechnical propelling charge according to claim 11 for use in said gas generator is provided.

Advantageous embodiments of the invention are stated in the subclaims which can be optionally combined with each other.

The gas generator according to the invention comprises a pyrotechnical propelling charge, wherein the propelling charge is formed from a first and at least a second master batch which are in a mixed state in a filling. Each master batch has a plurality of molded propellant bodies having defined geometry and having a relative quickness. The relative quickness $RQ_2$ of the second master batch is less than the relative quickness $RQ_1$ of the first master batch, wherein $RQ_2=RQ_1 \cdot fq$ and $fq \leq 0.9$.

Depending on the type and composition of propellant, thus only few propellant master batches are required which are produced with significant deviation of the ballistic properties of the molded propellant bodies in the individual master batches. The ballistics of the individual master batches is determined by way of their relative quickness RQ. From said master batches having different ballistics all propelling charges having desired predefined ballistic properties can be produced as needed via individual mixing ratios. The mixing ratio is adjusted for use in the gas generator by way of the ballistics of the individual master batches and the desired ballistics of the propelling charge.

The amount and the point in time of mixing the master batches can be adapted to the respective fabrication orders for the gas generator. Moreover, it is advantageous to mix the master batches in situ at the gas generator production line. The propelling charge having the desired ballistic properties then can be provided just in time. Thus, the logistic effort for a change of propellants and variants of performance of a gas generator can be further reduced.

Of preference, the molded propellant bodies in the first and second master batches as well as optionally in each further master batch show the same composition, viz. both regarding the propellant components contained in the master batch and preferably regarding the proportions of the components. In this way, the production of the pyrotechnical propelling charge can be further facilitated. Furthermore, it is then ensured that the individual master batches are mutually compatible.

Especially preferred, the geometry of the molded propellant bodies in the first master batch is identical, but it is different from the geometry of the molded propellant bodies in the second master batch. Via the different geometry of the molded propellant bodies the ballistic properties of the respective master batches can be influenced and adjusted especially easily.

The molded propellant bodies are preferably present in the form of propellant pellets which can be produced by extrusion, dry pressing or wet pressing. The molded propellant bodies may also take any other predefined shape, however. It is further possible to provide the molded bodies with one or more through-holes. Such single-hole and multi-hole bodies may be produced, for example, by extrusion-molding.

Of preference, the molded propellant bodies are present in the form of propellant pellets. Especially preferred, the propellant pellets in the first and second as well as optionally any further master batches have the same diameter but different height. Especially preferred, the diameter of the propellant pellets in each of the master batches is within a range of from 2 to 10 mm, preferably of from 2 to 8 mm, further preferred of from 3 to 8 mm, further preferred of from 3 to 6 mm and especially preferred of from 4 to 8 mm.

The height of the propellant pellets in the individual master batches may be within a range of from 1 to 6 mm, especially of from 1 to 5 mm, preferably of from 1 to 4 mm, especially preferred of from 1 to 3 mm.

According to a preferred embodiment, the pyrotechnical propelling charge is formed from a first and a second master batch, wherein fq is within a range of from 0.4 to 0.9, preferably of from 0.4 to 0.8.

According to a further embodiment, the pyrotechnical propelling charge may be formed from more than two master batches. In general, it is applicable in this case that the relative quickness $RQ_1$ of one single master batch is larger than the relative quickness $RQ_{x+1}$ of the following master batch, wherein $RQ_x \geq RQ_{x+1} \times 0.9$. If the pyrotechnical propelling charge is formed from three master batches, for example, $RQ_1$ denotes the relative quickness of the first master batch, $RQ_2$ denotes the relative quickness of the second master batch and $RQ_3$ denotes the relative quickness of the third master batch, wherein $RQ_1 > RQ_2 > RQ_3$ and $RQ_1 \geq RQ_2 \times 0.9$ as well as $RQ_2 \geq RQ_3 \times 0.9$. Although the use of more than three master batches is possible, it is less preferred as then the effort for providing and testing the master batches is increased.

Of preference, the ballistic properties of the first and second master batches as well as optionally of the further master batches are adjusted so that the time measured by activating a gas generator in a closed test can until the maximum can pressure $tpK_{max}(1)$ of the first master batch is reached is shorter by a factor 1.5 to 3.2 than the time $tpK_{max}(2)$ of the second master batch and optionally of the further master batches, i.e. $tpK_{max}(1) \times ft = tpK_{max}(2)$ with ft=1.5 to 3.2. Preferably ft is within a range of from 1.5 to 2.8, especially preferred of from 1.6 to 2.0. In other words, the first master batch has a time measured in a can test until the maximum can pressure $tpK_{max}(1)$ is reached and the second master batch has a time measured in equal test conditions in the can test until the maximum can pressure $tpK_{max}(2)$ is reached, wherein $tpK_{max}(1) \cdot ft = tpK_{max}(2)$, wherein ft is within a range of from 1.5 to 3.2, preferably within a range of from 1.5 to 2.8 and especially preferred within a range of from 1.6 to 2.0.

A further subject matter of the invention is a method for producing the pyrotechnical propelling charge for use in a gas generator comprising the following steps of:

providing a first master batch out of a plurality of molded propellant bodies having predefined geometry and a first relative quickness $RQ_1$;

providing a second master batch out of a plurality of molded propellant bodies having predefined geometry and a second relative quickness $RQ_2$, wherein the relative quickness $RQ_2$ of the second master batch is less than the relative quickness $RQ_1$ of the first master batch, wherein $RQ_2 = RQ_1 \cdot fq$ and $fq \leq 0.9$; and mixing a predetermined amount of the first master batch with a predetermined amount of the second master batch while forming the pyrotechnical propelling charge in the form of a filling in which the molded propellant bodies are present in a mixed state.

Mixing the master batches results in a homogenous mixture of the molded propellant bodies so that random samples of the mixed propelling charge have substantially identical ballistic properties.

According to another embodiment, the method further comprises a step in which at least one further master batch out of a plurality of molded propellant bodies having predefined geometry and a respective relative quickness $RQ_3$ is provided, wherein the geometry of the molded propellant body in the further master batch is different from the geometry of the molded propellant bodies in the first and second master batches, and wherein the relative quickness $RQ_3$ of the further master batch is less than the relative quickness $RQ_2$ of the second master batch, wherein $RQ_3 = RQ_2 \cdot fq$ and $fq \leq 0.9$, preferably fq=0.4 to 0.9.

Especially preferred, the geometry of the molded propellant bodies is equal within the individual master batches but is different from the geometry of the molded propellant bodies in each of the other master batches.

According to a preferred embodiment, initially a desired ballistic property of the pyrotechnical propelling charge is defined and the predetermined amounts of the first master batch and of the second master batch as well as optionally of the further master batches are adjusted so that the filling of the molded propellant bodies out of mixed master batches has the desired ballistic property.

As desired ballistic property of the pyrotechnical propelling charge the relative quickness RQ, the maximum combustion chamber pressure of a gas generator $pBKGG_{max}$, the time until reaching the maximum combustion chamber pressure of the gas generator $tpBKGG_{max}$, the maximum chamber pressure in a standard combustion chamber $pBK_{max}$, the time until reaching the maximum chamber pressure in the standard combustion chamber $tpBK_{max}$, the maximum can pressure in a can test $pK_{max}$, the time until reaching the maximum can pressure in the can test $tpK_{max}$, the burn-off rate and/or the burn-off duration of the propelling charge can be defined. The ballistic parameters of the pyrotechnical propellant and of the individual master batches are determined in identical test conditions so that a direct comparison of the parameters is possible.

The inventors especially found that the ballistic profile of the pyrotechnical propelling charge is influenced more strongly by the first master batch having high relative quickness. Thus, a smaller amount of said master batch has to be used. The master batch having smaller relative quickness typically includes molded bodies of larger dimensions, however, which allow for more light-weight production at lower cost. Thus, the manufacturing costs of the pyrotechnical propelling charge can be reduced.

Of preference, mixing of the master batches is carried out while forming the pyrotechnical propelling charge directly at the production line of the gas generator. In this way, flexible response to the manufacture of different gas generator variants is possible without new variants of propellant having to be provided. Mixing the pyrotechnical propelling charge "just in time" at the production line moreover contributes to reduction of the costs for stock-keeping.

The present invention enables a pyrotechnical propellant having defined ballistic properties to be provided as needed in a desired amount and at the desired point in time during manufacture of a gas generator. Moreover, by the invention the number of propellant variants can be reduced which have to be kept in stock in a pressed state. Furthermore, also the testing effort for the individual propellant batches is reduced in this way. Providing master batches comprising molded bodies having defined geometry and ballistic profile further enables the propellant ballistics to be individually adapted to the respective gas generator variant.

BRIEF DESCRIPTION OF THE DRAWINGS

Further features and advantages of the invention will be resulting from the following description and from the following figures which will be referred to and wherein.

DESCRIPTION

Production of the Master Batches

Figure 1:
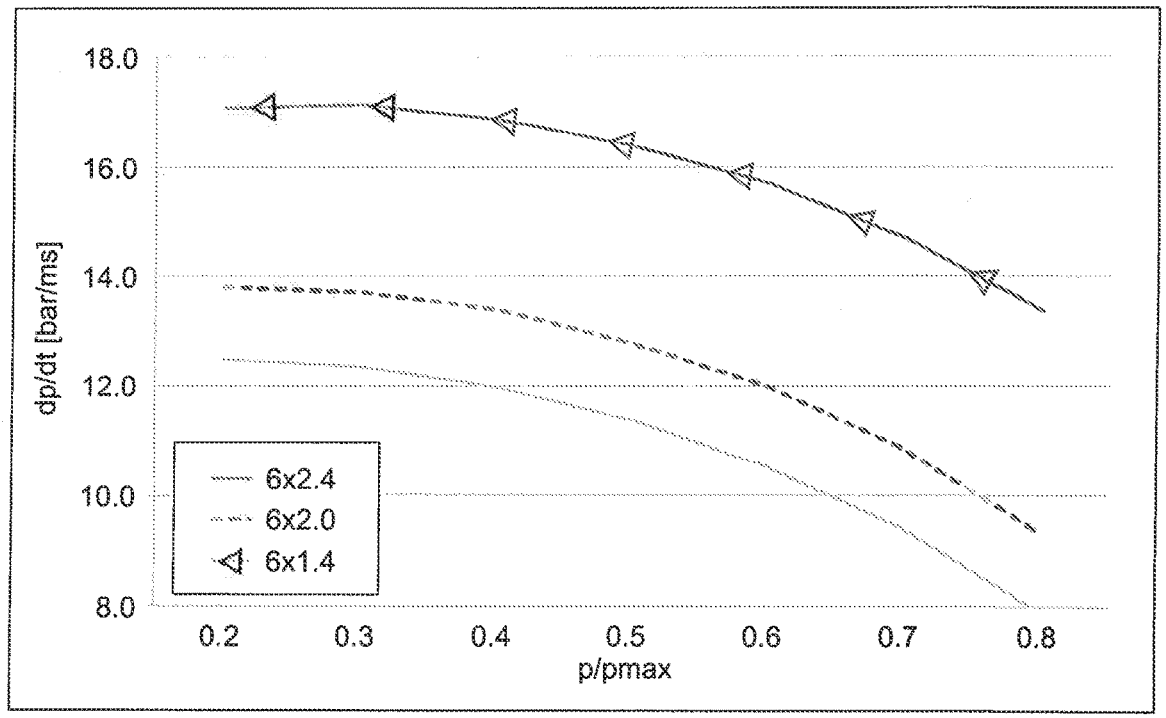
FIG. 1 shows a diagram representing the relative quickness of propelling charges from master batches having different mixing ratios.

A propellant powder made from 45% by weight of guanidine nitrate, 50% of basic copper nitrate and 5% of guar gum was ground and in dry state pressed into cylindrical propellant pellets having predefined dimensions. Instead of said 5% of guar gum, in general a 5% proportion of an additive may be used.

The propellant pellets obtained in this way were provided as master batches in each of which only propellant pellets having defined geometry were present. In all master batches the diameter of the cylindrical propellant pellets was 6 mm. The height of the propellant pellets in the first master batch was 1.4 mm, in the second master batch it was 2.0 mm which also constitutes a reference batch, in the third master batch it was 2.4 mm and in the fourth master batch it was 3.0 mm.

In the same way, another master batch was produced from propellant pellets having a diameter of 4.0 mm and a height of 1.3 mm.

Mixing Tests and Ballistic Tests

The master batches produced in this way were mixed in various proportions so that a propelling charge in which the propellant pellets of the respective master batches were present in a homogenous mixture in a filling was obtained.

The ballistic properties of the master batches and of the propelling charges produced by mixing the master batches were examined by ballistic tests in the standard combustion chamber and in a standard gas generator. For the propelling charges and the master batches used for producing each of the propelling charges the same test conditions were employed, i.e. when examining the propelling charges (mixtures) and, resp., master batches the same test conditions were applied. Hence the master batches and the propelling charges were tested with the same charge, propellant composition, gas generator structure and volume of the respective test vessels. Thus, the variations of the ballistic parameters can be traced back solely to the geometry of the molded propellant bodies.

A closed-off vessel having a defined volume (100 ccm) in which the propellant as such is burnt off is referred to as "standard combustion chamber". Pressure/time curves which characterize the tested propellant in terms of ballistics are resulting from said test. The standard combustion chamber is a generally acknowledged means for examining the ballistic properties of pyrotechnical propellants and propelling charge powders. The relative change of the ballistic properties of the tested master batches and propelling charges are only dependent, in the case of an equal standard combustion chamber (volume), charge and equal propellant composition, on the geometry of the tested molded propellant bodies. Thus, the standard combustion chamber allows to compare the different propellant geometries without any further adaptation of the test rig used.

In the so-called "can test", a standard gas generator is loaded with a propelling charge and is activated in a closed test can having a defined volume (60 liters). Similar to the test in the standard combustion chamber, a pressure/time curve is obtained which may equally be used to characterize the respective propelling charge in terms of ballistics. Using the same gas generator with the same load and the same propellant composition, the relative variations among the propelling charges and master batches to be compared are only dependent on the geometry of the molded propellant bodies.

The relative quickness was determined by testing the respective propelling charge or master batch in the standard combustion chamber. The standard combustion chamber used was a closable vessel made from steel having a volume of 100 cm$^3$. 10 g of propellant were filled into the standard combustion chamber and the standard combustion chamber was closed. The propellant was ignited at room temperature by means of a pyrotechnical igniter. The increase in pressure during the propellant burn-off was detected by means of a piezo sensor having a scanning rate of 20 kHz. Said measurement results in a pressure/time curve which is evaluated to determine the relative quickness.

To this end, the first derivation dp/dt of the pressure/time curve is formed and the function values are established at the supporting points at 0.2, 0.3, 0.4, 0.5, 0.6, 0.7 and 0.8 $p/p_{max}$ of the first derivation. The mean value of the function values established at the supporting points corresponds to the relative quickness RQ. The relative quickness RQ is a measure for the pressure variation per time [bar/ms] in the standard combustion chamber when the propellant is being burnt off.

The following table 1 illustrates a comparison of the ballistic properties of the produced master batches from tests in the standard combustion chamber. Column "fq" indicates the $RQ_2$ to $RQ_1$ ratio with $RQ_1$ denoting the relative quickness of the respective master batch having the smaller molded propellant bodies (1) and $RQ_2$ denoting the relative quickness of the master batch having the molded propellant bodies (2) larger as compared to the first master batch. In column "ft" the corresponding ratio for the time until reaching the maximum pressure of the standard combustion chamber $tpBK_{max}(2)$ to $tpBK_{max}(1)$ is indicated.

TABLE 1

Comparison of the master batches having different geometries in the standard combustion chamber

| Master batch geometry | | Factors | |
|---|---|---|---|
| small (1) | large (2) | fq = RQ$_2$/RQ$_1$ | ft = tpBK$_{max}$(2)/ tpBK$_{max}$(1) |
| 6 × 1.4 | 6 × 2.4 | 0.71 | 1.35 |
| 6 × 1.4 | 6 × 3.0 | 0.6 | 1.64 |
| 4 × 1.3 | 6 × 3.0 | 0.49 | 1.88 |

FIG. 1 is a representation of the first derivation of the pressure/time curve from the test run in the standard combustion chamber for the first, second and third master batches. From said curves the relative quickness of the master batches as afore-described can be established.

The results of the ballistic tests in the standard combustion chamber correlate with the results of the can test. Table 2 exemplifies a comparison of two master batches comprising propellant pellets of 6×1.4 mm and 6×2.4 mm with respect to the time until reaching the maximum can pressure tpK$_{max}$; and, resp., the ratio of said respective times.

TABLE 2

Comparison of master batches having different geometries in the can test

| Master batch geometry | | Factor |
|---|---|---|
| small (1) | large (2) | tpK$_{max}$(2)/tpK$_{max}$(1) |
| 6 × 1.4 | 6 × 2.4 | 1.79 |

In the following table 3, the ballistic parameters obtained from the can test and by the examination in the standard combustion chamber for the first, second and third master batches are indicated. Moreover, the ballistic parameters of propelling charges obtained from mixtures of the first and third master batches are additionally indicated. For carrying out the can test, a common gas generator was loaded with 72 g of propellant and was activated in a closed test can (60 l/10 bar) at room temperature. The test in the standard combustion chamber was carried out as described before in connection with establishing the relative quickness. In the table pK$_{max}$ denotes the maximum can pressure, tpK$_{max}$ denotes the time until the maximum can pressure is reached and RQ denotes the pressure variation per time in [bar/ms] in the standard combustion chamber.

TABLE 3

Ballistic properties of master batches and propelling charges from mixtures of master batches

| Propelling charges | Ballistic parameters | | |
|---|---|---|---|
| Master batches [mm] | pK$_{max}$ [bar] | tpK$_{max}$ [ms] | RQ [bar/ms] |
| 6 × 1.4 | 3.9 | 54.2 | 15.9 |
| 6 × 2.0 | 3.6 | 81.3 | 12.3 |
| 6 × 2.4 | 3.5 | 97.1 | 10.9 |

| Mixing ratio | | | | |
|---|---|---|---|---|
| 6 × 1.4 [%] | 6 × 2.4 [%] | pK$_{max}$ [bar] | tpK$_{max}$ [ms] | RQ [bar/ms] |
| 50 | 50 | 3.6 | 64.4 | 13.1 |
| 40 | 60 | 3.5 | 70.1 | 13.2 |
| 30 | 70 | 3.5 | 81.2 | 12.2 |
| 20 | 80 | 3.4 | 88.4 | 11.7 |
| 10 | 90 | 3.4 | 95.0 | 11.2 |

It is evident from the table that the ballistic properties of the second master batch, viz. the reference batch, including propellant pellets of 6×2.0 mm can be reconstructed by a 30/70 mixture of the first and third master batches comprising propellant pellets of 6×1.4 mm and 6×2.4 mm. In this case, the proportion of the smaller propellant pellets of the first master batch in the propelling charge produced by mixing the master batches is below the proportion to be expected from the pellet height. Hence, in proportion more propellant pellets of the third master batch having larger dimensions are required to achieve the ballistic goal.

Figure 2:
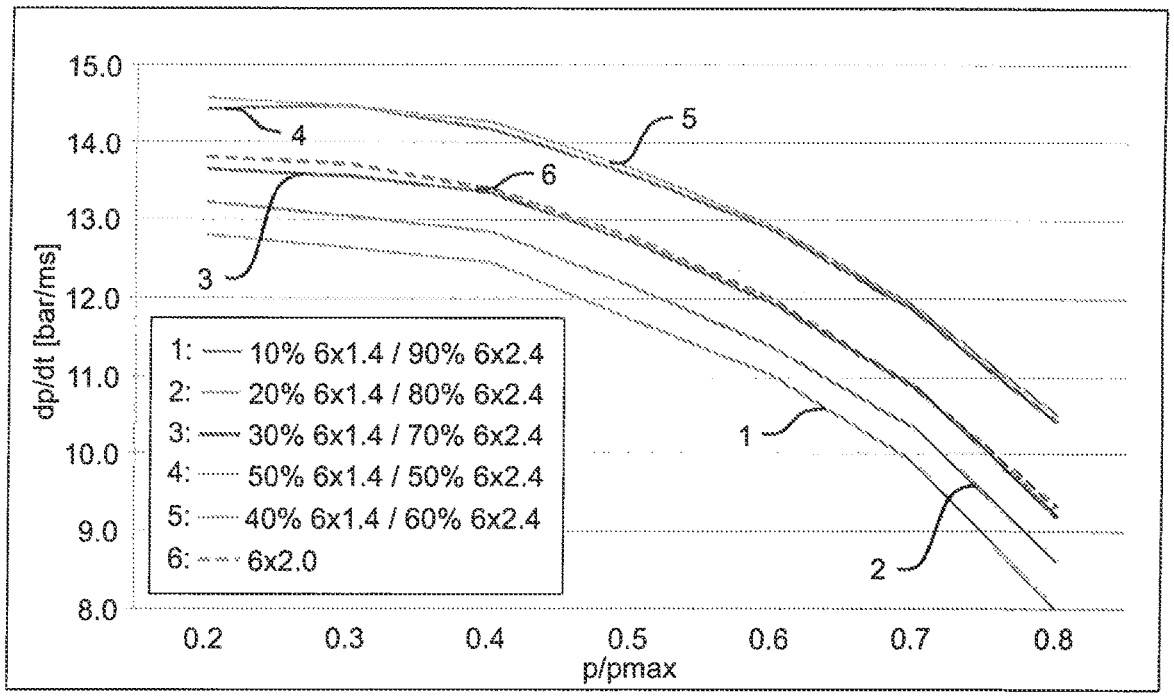
FIG. 2 shows a diagram representing the first derivation of a pressure/time curve for different master batches obtained in the standard combustion chamber.

FIG. 2 illustrates a diagram representing the first derivation of the pressure/time curves for the second master batch obtained by testing in the standard combustion chamber as compared to a mixture of the first and third master batches in different proportions of 50/50, 40/60, 30/70, 20/80 and 90/10. The representation equally illustrates that the ballistic profile of the second master batch can be reconstructed by a 30/70 mixture of the first and third master batches. Unless otherwise indicated, the given proportions relate to percent by weight. At the same time, the test illustrates that the ballistic profile of a mixture of molded propellant bodies is influenced more strongly by the molded bodies having smaller dimensions. This means that in the propelling charge produced by mixing the master batches for achieving the ballistic goal, in this case the master batch comprising propellant pellets of 6×2.0 mm, a higher proportion of larger molded bodies is required than it would be resulting from calculation merely on the basis of the differences of the pellet height.

Figure 3:
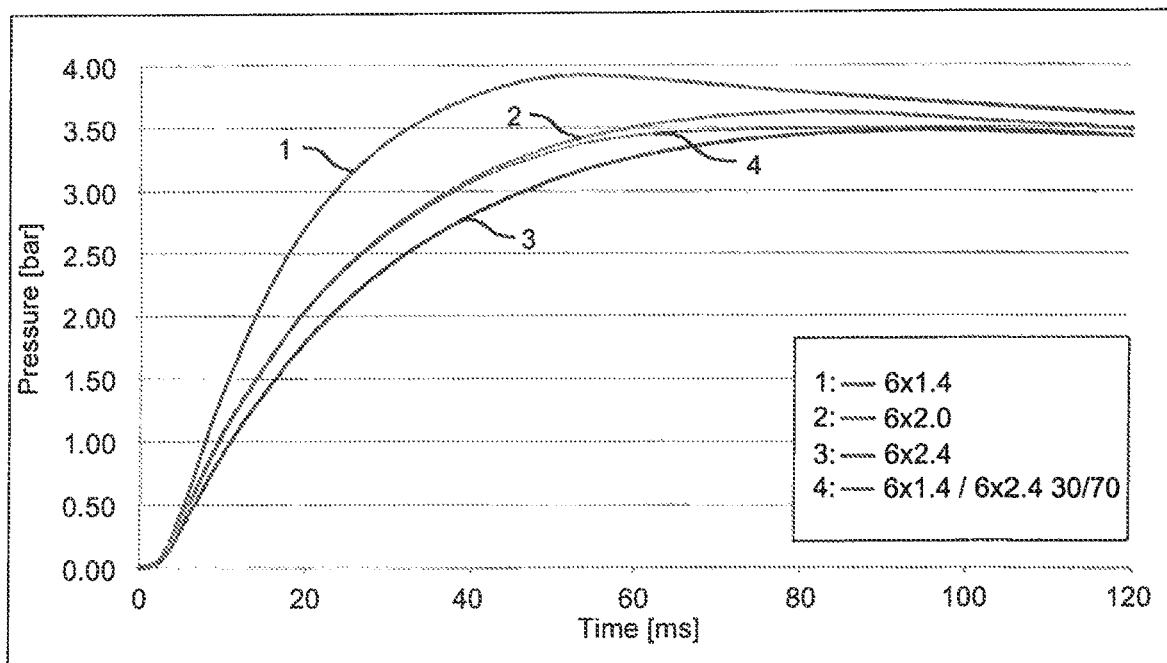
FIG. 3 shows a diagram representing the can pressure curve of propelling charges from mixed master batches having different propellant geometry.

FIG. 3 illustrates the pressure/time curve of the first, second and third master batches as well as of a 30/70 mixture of the first and third master batches established in the can test. Again, it turns out that the ballistic profile of the second master batch, viz. of the reference batch, can be reproduced by the 30/70 mixture of the first and third master batches. In each case the average from 5 tests is indicated.

The invention claimed is:

1. A gas generator comprising a pyrotechnical propelling charge, wherein the propelling charge is formed from a first and at least a second master batch which are in a mixed state in a filling, each master batch having a plurality of molded propellant bodies having defined geometry and having a relative quickness, wherein the relative quickness RQ$_2$ of the second master batch is less than the relative quickness RQ$_1$ of the first master batch, wherein RQ$_2$=RQ$_1$·fq and fq≤0.9, and wherein the first and second master batches are mixed in predetermined amounts so that the propelling charge exhibits predetermined ballistic properties;
wherein the molded propellant bodies of the first master batch and the second master batch have the same composition;
wherein the molded propellant bodies of the first master batch have equal geometries;
wherein the molded propellant bodies of the second master batch have equal geometries; and wherein the geometries of the molded propellant bodies of the first master batch are different than the geometries of the molded propellant bodies of the second master batch.

2. The gas generator according to claim 1, wherein the molded propellant bodies are present in the form of propellant pellets.

3. The gas generator according to claim 2, wherein the propellant pellets in the master batches have the same diameter but different height.

4. The gas generator according to claim 3, wherein the diameter is within a range of from 2 mm to 10 mm.

5. The gas generator according to claim 1, wherein the fq is within a range of from 0.4 to 0.9.

6. The gas generator according to claim 1, wherein the propelling charge is formed from more than two master batches, with $RQ_x$ denoting the relative quickness of one single master batch and being larger than the relative quickness $RQ_{x+1}$ of the next master batch, wherein $RQ_x \geq RQ_{x+1} \cdot 0.9$.

7. The gas generator according to claim 6, wherein the propelling charge is formed from three master batches, with $RQ_1$ denoting the relative quickness of the first master batch, $RQ_2$ denoting the relative quickness of the second master batch and $RQ_3$ denoting the relative quickness of the third master batch, wherein $RQ_1 > RQ_2 > RQ_3$ and $RQ_1 \geq RQ_2 \cdot 0.9$ as well as $RQ_2 \geq RQ_3 \cdot 0.9$.

8. The gas generator according to claim 1, wherein the first master batch shows a time until reaching the maximum can pressure $tpK_{max}(1)$ measured in a can test and the second master batch shows a time until reaching the maximum can pressure $tpK_{max}(2)$ measured in equal test conditions in the can test, wherein $tpK_{max}(1) \cdot ft = tpK_{max}(2)$, wherein ft is within a range of from 1.35 to 3.2.

9. The gas generator according to claim 1, wherein the molded propellant bodies of the first and second master batches are produced by one of extrusion, dry pressing, and wet pressing.

10. The gas generator according to claim 1, wherein the molded propellant bodies of the first and second master batches are cylindrical, have the same diameter, and are cut to different lengths to produce their different geometries.

11. The gas generator according to claim 10, wherein the molded propellant bodies of the first and second master batches are produced by extrusion and include a through-hole.

12. The gas generator according to claim 1, wherein the respective relative quickness RQ is determined by testing a sample of 10 g of the respective propelling charge or master batch in a standard combustion chamber, wherein the standard combustion chamber is a closable vessel made from steel having a volume of 100 cm³, wherein the sample is ignited at room temperature within the standard combustion chamber by means of a pyrotechnical igniter and the increase in pressure during the propellant burn-off is detected by means of a piezo sensor having a scanning rate of 20 kHz so that it results in a pressure/time curve which is evaluated to determine the relative quickness RQ, and wherein the evaluation is based on the first derivation dp/dt of the pressure/time curve and the function values are established at the supporting points at 0.2, 0.3, 0.4, 0.5, 0.6, 0.7 and 0.8 $p/p_{max}$ of the first derivation and the mean value of the function values established at the supporting points corresponds to the respective relative quickness RQ.

13. A method for producing a pyrotechnical propelling charge for use in a gas generator comprising the following steps of:

providing a first master batch consisting of a plurality of molded propellant bodies each having the same predefined geometry and a first relative quickness $RQ_1$;

providing a second master batch consisting of a plurality of molded propellant bodies each having the same predefined geometry and a second relative quickness $RQ_2$, wherein the molded propellant bodies of the first master batch and the second master batch have the same composition, and wherein the relative quickness $RQ_2$ of the second master batch is less than the relative quickness $RQ_1$ of the first master batch, wherein $RQ_2 = RQ_1 \cdot fq$ and $fq \leq 0.9$, the predefined geometry of the molded propellant bodies of the second master batch being different than the predefined geometry of the molded propellant bodies of the first master batch; and mixing a predetermined amount of the first master batch with a predetermined amount of the second master batch while forming the pyrotechnical propelling charge in the form of a filling in which the molded propellant bodies are present in a mixed state so that the propelling charge exhibits predetermined ballistic properties.

14. The method according to claim 13, wherein the molded propellant bodies are in a homogenously mixed state in the filling.

15. The method according to claim 13, wherein at least one further master batch consisting of pyrotechnical propellant comprising a plurality of molded propellant bodies having predefined geometry and a relative quickness $RQ_3$ is provided, the geometry of the molded propellant bodies in the further master batch being different from the geometry of the molded propellant bodies in the first and second master batches and the relative quickness $RQ_3$ of the further master batch being less than the relative quickness $RQ_2$ of the second master batch, wherein $RQ_3 = RQ_2 \cdot fq$ and $fq \leq 0.9$.

16. The method according to claim 13, wherein the ballistic property is selected from the group consisting of a relative quickness RQ of the pyrotechnical propelling charge, a maximum chamber pressure for the pyrotechnical propelling charge in a standard combustion chamber $pBK_{max}$, a maximum can pressure for the pyrotechnical propelling charge in a can test $pK_{max}$, a time until reaching the maximum chamber pressure for the pyrotechnical propelling charge in the standard combustion chamber $tpBK_{max}$, a time until reaching the maximum can pressure for the pyrotechnical propelling charge in the can test $tpK_{max}$, a maximum combustion chamber pressure of a gas generator $pBKGG_{max}$ utilizing the pyrotechnical propelling charge, a time until reaching the maximum combustion chamber pressure in the gas generator $tpBKGG_{max}$ utilizing the pyrotechnical propelling charge, and a burn-off rate and/or the burn-off duration of the pyrotechnical propelling charge.

17. The method according to claim 13, wherein the mixing of the master batches is carried out directly at a production line of the gas generator.

18. The method according to claim 13, wherein providing the first and second master batches comprises producing their respective molded propellant bodies by one of extrusion, dry pressing, and wet pressing.

19. The method according to claim 18, wherein producing the respective molded propellant bodies of the first and second master batches by extrusion comprises extruding the propellant bodies to be cylindrical in form with equal diameters, and wherein the propellant bodies of the first master batch are cut to a different length than the propellant bodies of the second master batch.

20. The method according to claim 19, wherein providing the first and second master batches comprises producing their respective molded propellant bodies by extrusion to include a through-hole.

21. The method according to claim 19, wherein the first and second master batches are included in the filling in a predetermined ratio, and wherein extruding the propellant bodies of the first and second master batches comprises cutting the respective propellant bodies to their respective lengths according to the predetermined ratio directly during the extrusion process.

22. The gas generator according to claim 13, wherein the respective relative quickness RQ is determined by testing a sample of 10 g of the respective propelling charge or master batch in a standard combustion chamber, wherein the standard combustion chamber is a closable vessel made from steel having a volume of 100 cm$^3$, wherein the sample is ignited at room temperature within the standard combustion chamber by means of a pyrotechnical igniter and the increase in pressure during the propellant burn-off is detected by means of a piezo sensor having a scanning rate of 20 kHz so that it results in a pressure/time curve which is evaluated to determine the relative quickness RQ, and wherein the evaluation is based on the first derivation dp/dt of the pressure/time curve and the function values are established at the supporting points at 0.2, 0.3, 0.4, 0.5, 0.6, 0.7 and 0.8 $p/p_{max}$ of the first derivation and the mean value of the function values established at the supporting points corresponds to the respective relative quickness RQ.

* * * * *

UNITED STATES PATENT AND TRADEMARK OFFICE
CERTIFICATE OF CORRECTION

| | |
|---|---|
| PATENT NO. | : 11,433,850 B2 |
| APPLICATION NO. | : 16/319573 |
| DATED | : September 6, 2022 |
| INVENTOR(S) | : Jörg Friedrich et al. |

It is certified that error appears in the above-identified patent and that said Letters Patent is hereby corrected as shown below:

On the Title Page

Item (12):
Delete "Jörg et al"
Insert --Friedrich et al.--.

Item (72) Inventors:
Delete "Friedrich Jörg, Oberbergkirchen (DE)"
Insert --Jörg Friedrich, Oberbergkirchen (DE)--.

Signed and Sealed this
Thirty-first Day of January, 2023

Katherine Kelly Vidal
*Director of the United States Patent and Trademark Office*